United States Patent
Castle

(10) Patent No.: US 9,487,137 B1
(45) Date of Patent: Nov. 8, 2016

(54) SAFETY MESSAGE PLAYBACK DEVICE FOR AN AUTOMOBILE

(71) Applicant: Mark Castle, Corpus Christi, TX (US)

(72) Inventor: Mark Castle, Corpus Christi, TX (US)

(*) Notice: Subject to any disclaimer, the term of this patent is extended or adjusted under 35 U.S.C. 154(b) by 0 days.

(21) Appl. No.: 14/698,592

(22) Filed: Apr. 28, 2015

(51) Int. Cl.
| | |
|---|---|
| B60Q 5/00 | (2006.01) |
| G06F 1/18 | (2006.01) |
| G06F 1/16 | (2006.01) |
| H01H 36/00 | (2006.01) |
| H04R 1/00 | (2006.01) |

(52) U.S. Cl.
CPC ............ B60Q 5/005 (2013.01); G06F 1/1688 (2013.01); G06F 1/182 (2013.01); H01H 36/0073 (2013.01); H04R 1/00 (2013.01); H04R 2499/13 (2013.01)

(58) Field of Classification Search
CPC .......... B60N 2/002; B60N 2/28; B60N 2/26; B60N 2202/4485; B60N 2002/0268; G06F 11/3065; G06F 21/88; G06F 1/163; G06F 1/1643; G06F 1/1698; G06F 1/1688; G06F 1/182; H05K 999/00; H01H 36/0046; H01H 9/167; H01H 36/0073; B60Q 5/005; H04R 1/00; H04R 2499/13
USPC ........... 361/679.01, 679.02; 340/457; 701/36
See application file for complete search history.

(56) References Cited

U.S. PATENT DOCUMENTS

| | | | |
|---|---|---|---|
| 4,750,197 A * | 6/1988 | Denekamp ............ | G07C 5/008 235/375 |
| 5,604,479 A | 2/1997 | Chang | |
| 7,348,889 B2 | 3/2008 | Monzo et al. | |
| 7,457,695 B1 | 11/2008 | Fields et al. | |
| 2012/0232749 A1* | 9/2012 | Schoenberg ........... | B60N 2/002 701/36 |
| 2014/0077943 A1* | 3/2014 | Bloukos ................... | B60Q 9/00 340/457 |

\* cited by examiner

Primary Examiner — Anthony Haughton
Assistant Examiner — Ingrid Wright
(74) Attorney, Agent, or Firm — Crossley & Stevenson Intellectual Property Law

(57) ABSTRACT

A safety message playback device for an automobile including a housing unit, a central processing unit disposed within the housing unit, a speaker disposed on a top surface of the housing unit, a battery compartment disposed within the housing unit, a rechargeable battery disposed within the battery compartment, a recordation and playback control disposed on the top surface of the housing unit, a pair of electrical cables, a magnetically triggered door sensor, and an adhesive strip disposed on a bottom surface of the housing unit. The recordation and playback control is configured to allow a user to record a message into the speaker for playback through the speaker when the recordation and playback control is activated. The speaker is configured to repeatedly playback the message the user has prerecorded when the magnetically triggered door sensor is in an open position.

3 Claims, 5 Drawing Sheets

US 9,487,137 B1

SAFETY MESSAGE PLAYBACK DEVICE FOR AN AUTOMOBILE

BACKGROUND OF THE INVENTION

Various types of car seat safety devices are known in the prior art. However, what has been needed is a safety message playback device for an automobile including a housing unit, a central processing unit disposed within the housing unit, a speaker disposed on a top surface of the housing unit, a battery compartment disposed within the housing unit, a rechargeable battery disposed within the battery compartment, a recordation and playback control disposed on the top surface of the housing unit, a pair of electrical cables, a magnetically triggered door sensor, and an adhesive strip disposed on a bottom surface of the housing unit. The adhesive strip is configured to securely attach the housing unit to a dashboard of an automobile. What has been further needed is for the recordation and playback control to be configured to allow a user to record a message into the speaker for playback through the speaker when the recordation and playback control is activated. Lastly, what has been needed is for the speaker to be configured to repeatedly playback the message the user has prerecorded when the magnetically triggered door sensor is in an open position. The safety message playback device thus provides an effective warning and reminder system for a driver of an automobile once the driver has opened a door of the automobile. This device is highly versatile and can be used to remind or warn a driver of numerous events, including, but not limited to, a child, pet, or adult in the back seat of the automobile, a future task, or a grocery list. Furthermore, the prerecorded message is less likely to be ignored by a user because it will be played back to the user in a recognizable voice.

FIELD OF THE INVENTION

The present invention relates to car seat safety devices, and more particularly, to a safety message playback device for an automobile.

SUMMARY OF THE INVENTION

The general purpose of the present safety message playback device for an automobile, described subsequently in greater detail, is to provide a safety device which has many novel features that result in a safety message playback device for an automobile which is not anticipated, rendered obvious, suggested, or even implied by prior art, either alone or in combination thereof.

To accomplish this, the present safety message playback device for an automobile includes a housing unit, a central processing unit, a speaker, a battery compartment, a rechargeable battery, a recordation and playback control, a pair of electrical cables, a magnetically triggered door sensor, and an adhesive strip. The housing unit has a top surface and a bottom surface. The housing unit can optionally be plastic. The housing unit can optionally be three inches by six inches. The central processing unit is disposed within the housing unit. The speaker is disposed on the top surface of the housing unit. The battery compartment is disposed within the housing unit. The rechargeable battery is disposed within the battery compartment. The recordation and playback control is disposed on the top surface of the housing unit. The recordation and playback control is configured to allow a user to record a message into the speaker for playback through the speaker when the recordation and playback control is activated.

The magnetically triggered door sensor includes a first magnet and a second magnet. The first magnet and the second magnet are colinearly disposed on a driver's side door of an automobile and an interior of an automobile, respectively. The magnetically triggered door sensor has an open position and an alternate closed position. The magnetically triggered door sensor is in the open position when the first magnet and the second magnet are apart from each other. The magnetically triggered door sensor is in the closed position when the first magnet and the second magnet are attached to each other. The speaker is configured to repeatedly playback the message the user has prerecorded when the magnetically triggered door sensor is in the open position.

The pair of electrical cables includes a first cord and a second cord. Each of the first cord and the second cord has a right end and a left end. The left end of each of the pair of electrical cables is disposed within the housing unit. The right end of the first cord is connected to a power source. The right end of the second cord is attached to one of the first magnet and alternately the second magnet. The power source is configured to charge the rechargeable battery when the first cord is connected to the power source.

The central processing unit, the speaker, the rechargeable battery, the power source, the recordation and playback control, and the magnetically triggered door sensor are in operational communication with each other.

The safety message playback device for an automobile further comprises an adhesive strip disposed on the bottom surface of the housing unit. The adhesive strip is configured to securely attach the housing unit to a dashboard of an automobile.

Thus has been broadly outlined the more important features of the present safety message playback device for an automobile so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
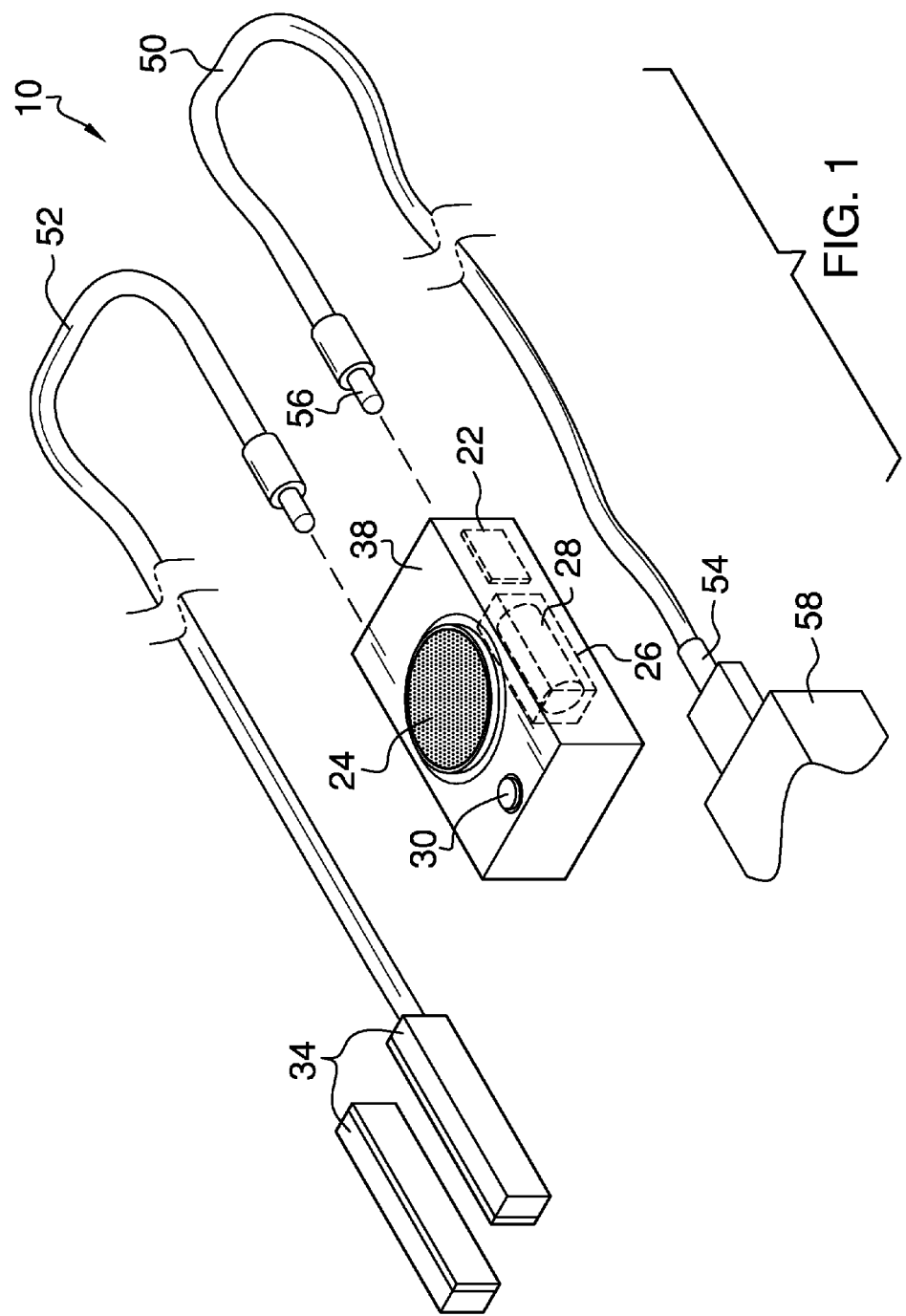
FIG. 1 is a front isometric view.
Figure 2:
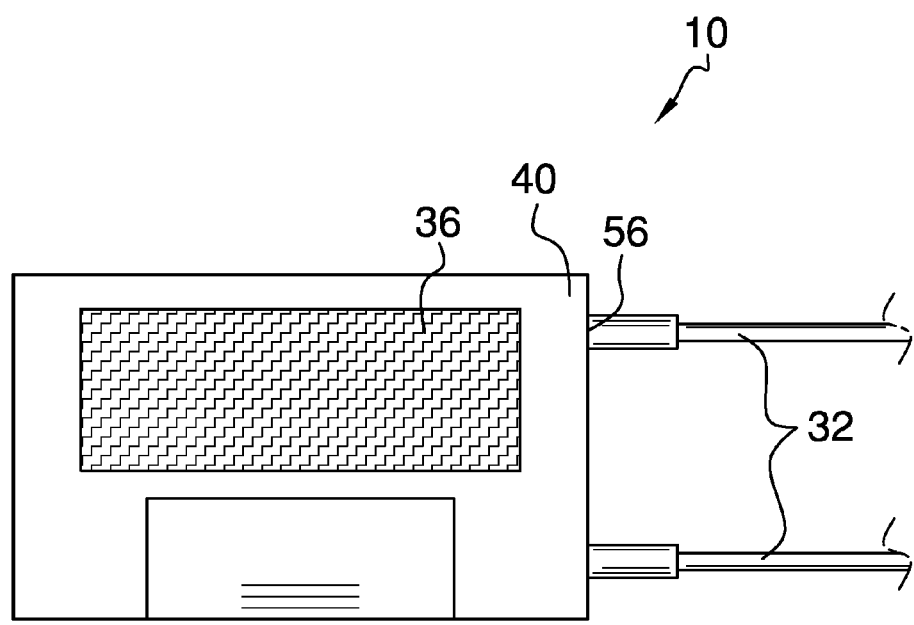
FIG. 2 is a bottom plan view.
Figure 3:
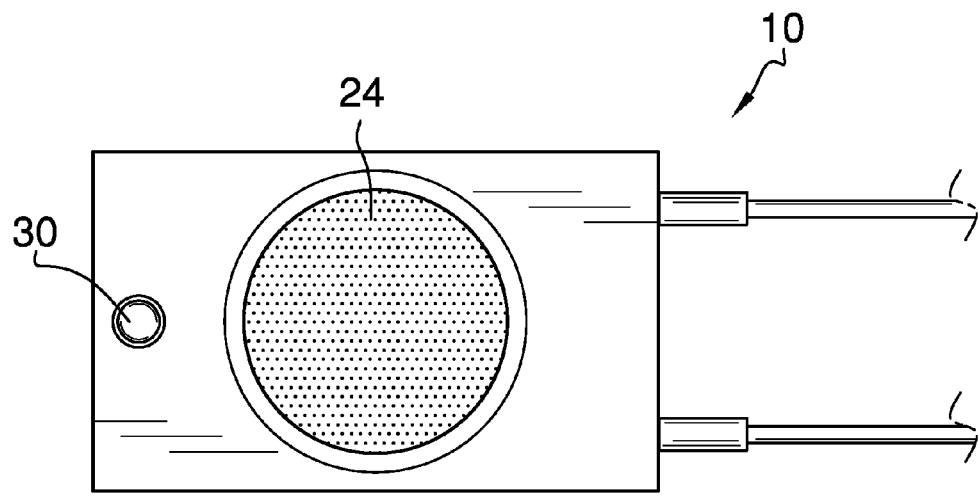
FIG. 3 is a top plan view.
Figure 4:
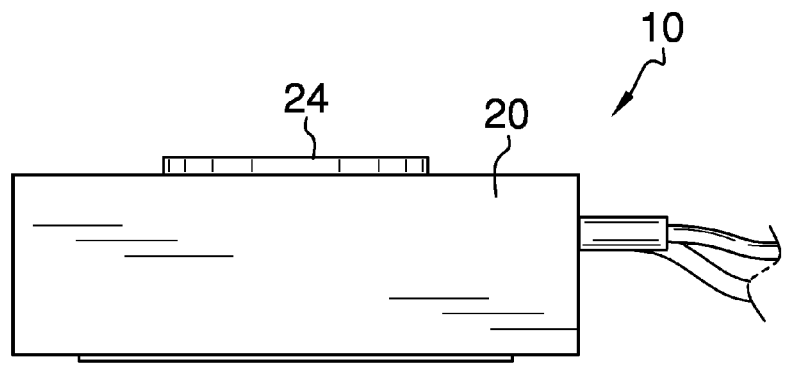
FIG. 4 is a side elevation view.

With reference now to the drawings, and in particular FIGS. 1 through 6 thereof, an example of the instant safety message playback device for an automobile employing the principles and concepts of the present safety message playback device for an automobile and generally designated by the reference number 10 will be described.

Referring to FIGS. 1 through 6 the present safety message playback device for an automobile 10 is illustrated. The safety message playback device for an automobile 10 includes a housing unit 20, a central processing unit 22, a speaker 24, a battery compartment 26, a rechargeable battery 28, a recordation and playback control 30, a pair of electrical cables 32, a magnetically triggered door sensor 34, and an adhesive strip 36. The housing unit 20 has a top surface 38 and a bottom surface 40. The central processing unit 22 is disposed within the housing unit 20. The speaker 24 is disposed on the top surface 38 of the housing unit 20. The battery compartment 26 is disposed within the housing unit 20. The rechargeable battery 28 is disposed within the battery compartment 26. The recordation and playback control 30 is disposed on the top surface 38 of the housing unit 20.

The magnetically triggered door sensor 34 includes a first magnet 41 and a second magnet 42. The first magnet 41 and the second magnet 42 are colinearly disposed on a driver's side door 44 of an automobile 46 and an interior 48 of an automobile 46, respectively.

The pair of electrical cables 32 includes a first cord 50 and a second cord 52. Each of the first cord 50 and the second cord 52 has a right end 54 and a left end 56. The left end 56 of each of the pair of electrical cables 32 is disposed within the housing unit 20. The right end 54 of the first cord 50 is connected to a power source 58. The right end 54 of the second cord 52 is attached to one of the first magnet 41 and alternately the second magnet 42.

Figure 5:
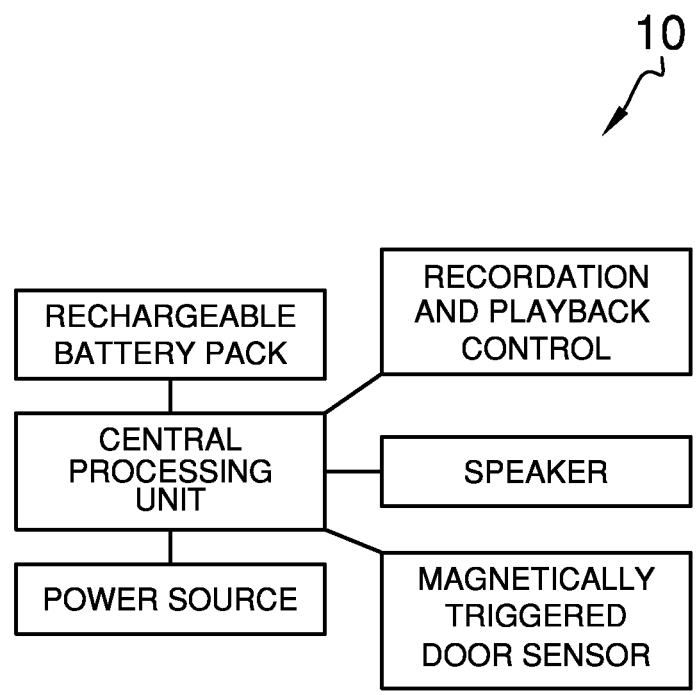
FIG. 5 is a block diagram showing the central processing unit, the speaker, the rechargeable battery, the power source, the recordation and playback control, and the magnetically triggered door sensor in operational communication with each other.
Figure 6:
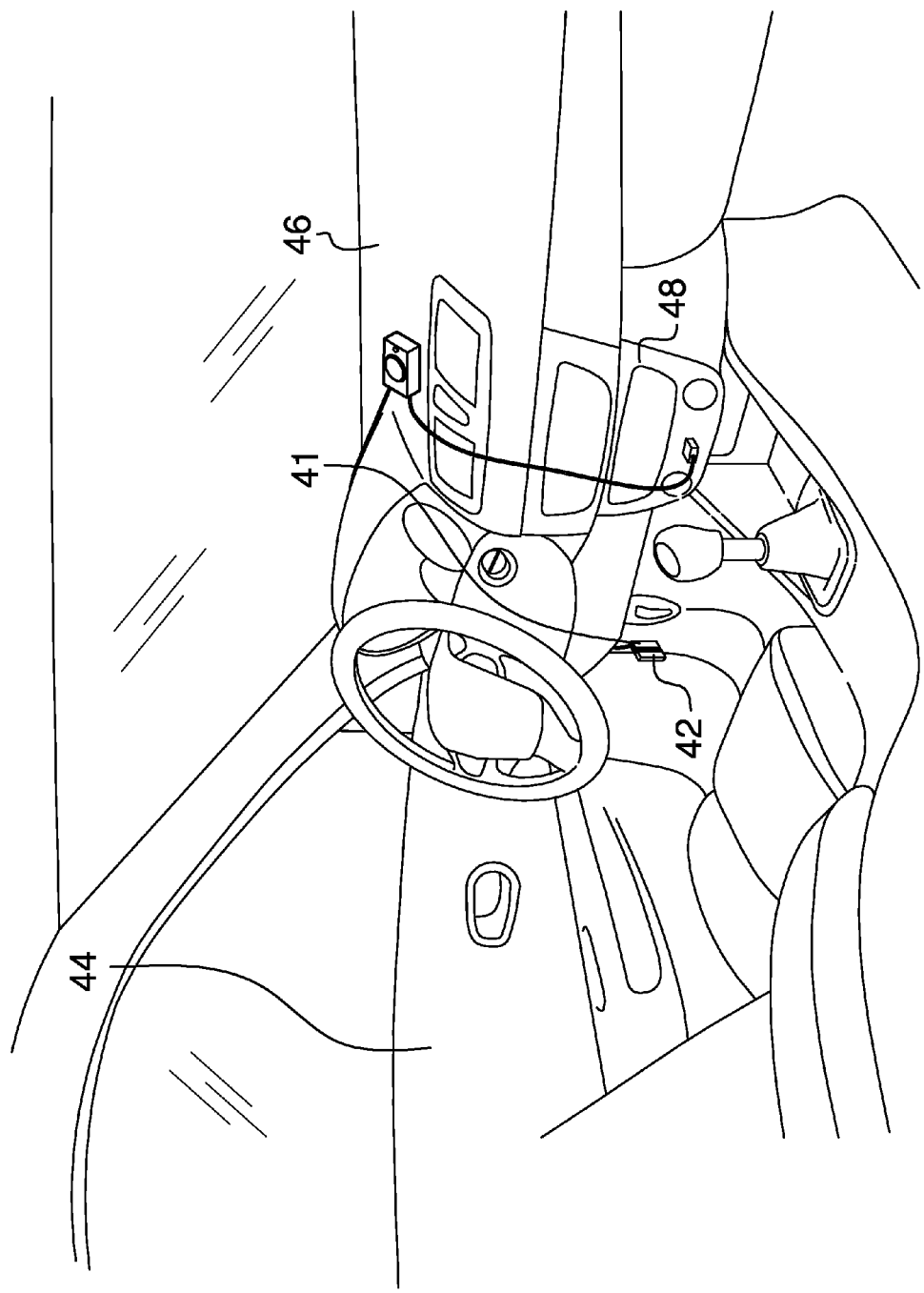
FIG. 6 is an in-use view.

As best shown in FIG. 5, the central processing unit 22, the speaker 24, the rechargeable battery 28, the power source 58, the recordation and playback control 30, and the magnetically triggered door sensor 34 are in operational communication with each other.

The safety message playback device for an automobile 10 further comprises an adhesive strip 60 disposed on the bottom surface 40 of the housing unit 20.

What is claimed is:

1. A safety message playback device for an automobile comprising:
    a housing unit having a top surface and a bottom surface;
    a central processing unit disposed within the housing unit;
    a speaker disposed on the housing unit top surface;
    a battery compartment disposed within the housing unit;
    a rechargeable battery disposed within the battery compartment;
    a recordation and playback control disposed on the housing unit top surface;
    wherein the recordation and playback control is configured to allow a user to record a message into the speaker for playback through the speaker when the recordation and playback control is activated;
    a magnetically triggered door sensor comprising a first magnet and a second magnet, the first magnet and the second magnet colinearly disposed on a driver's side door of an automobile and an interior of an automobile, respectively;
    wherein the magnetically triggered door sensor has an open position and an alternate closed position;
    wherein the magnetically triggered door sensor is in the open position when the first magnet and the second magnet are apart from each other;
    wherein the magnetically triggered door sensor is in the closed position when the first magnet and the second magnet are attached to each other;
    wherein the speaker is configured to repeatedly playback the message the user has prerecorded when the magnetically triggered door sensor is in the open position;
    a pair of electrical cables comprising a first cord and a second cord, each of the first cord and the second cord having a right end and a left end, the left end of each of the pair of electrical cables disposed within the housing unit, the right end of the first cord connected to a power source, the right end of the second cord attached to one of the first magnet and alternately the second magnet;
    wherein the power source is configured to charge the rechargeable battery when the first cord is connected to the power source;
    wherein the central processing unit, the speaker, the rechargeable battery, the power source, the recordation and playback control, and the magnetically triggered door sensor are in operational communication with each other; and
    an adhesive strip disposed on the housing unit bottom surface;
    wherein the adhesive strip is configured to securely attach the housing unit to a dashboard of an automobile.

2. The safety message playback device for an automobile of claim 1 wherein the housing unit is plastic.

3. The safety message playback device for an automobile of claim 1 wherein the housing unit is three inches by six inches.

* * * * *